United States Patent [19]

Back

[11] Patent Number: 5,724,856

[45] Date of Patent: Mar. 10, 1998

[54] SHIFTER FOR MANUAL TRANSMISSIONS

[75] Inventor: Ottmar Back, Waiblingen, Germany

[73] Assignee: Daimler-Benz AG, Stuttgart, Germany

[21] Appl. No.: 700,855

[22] Filed: Aug. 21, 1996

[30] Foreign Application Priority Data

Aug. 21, 1995 [DE] Germany ................ 195 30 616.3

[51] Int. Cl.$^6$ ................................................ F16H 63/16

[52] U.S. Cl. ................ 74/335; 74/337.5; 74/477; 74/745

[58] Field of Search ................ 74/335, 337.5, 74/473 R, 477, 745

[56] References Cited

U.S. PATENT DOCUMENTS

| | | | |
|---|---|---|---|
| 4,709,793 | 12/1987 | Sakakibara et al. | 74/473 R |
| 4,713,979 | 12/1987 | Muto et al. | 74/337.5 |
| 5,297,453 | 3/1994 | Chene | 74/477 |
| 5,365,800 | 11/1994 | Muller | 74/337.5 X |
| 5,433,125 | 7/1995 | Muller | 74/477 |

FOREIGN PATENT DOCUMENTS

| | | |
|---|---|---|
| 0 301 724 | 12/1992 | European Pat. Off. . |
| 0 547 007 | 6/1993 | European Pat. Off. . |
| 1 731 865 | 7/1956 | Germany . |

OTHER PUBLICATIONS

Japanese Abstract No. 4-19462, M-1242 Apr. 30, 1992, vol. 16/No. 181.

Primary Examiner—Charles A. Marmor
Assistant Examiner—Troy Grabow
Attorney, Agent, or Firm—Evenson, McKeown, Edwards & Lenahan, P.L.L.C.

[57] ABSTRACT

In a shifter of a manual transmission, a rotationally and axially movable shifter shaft is provided with a plurality of coupling members that are immovable with respect to it. The members are staggered with respect to one another both axially and in the circumferential direction. A shift fork is used for actuation through a counter-coupling member associated with the fork.

8 Claims, 4 Drawing Sheets

FIG. 3
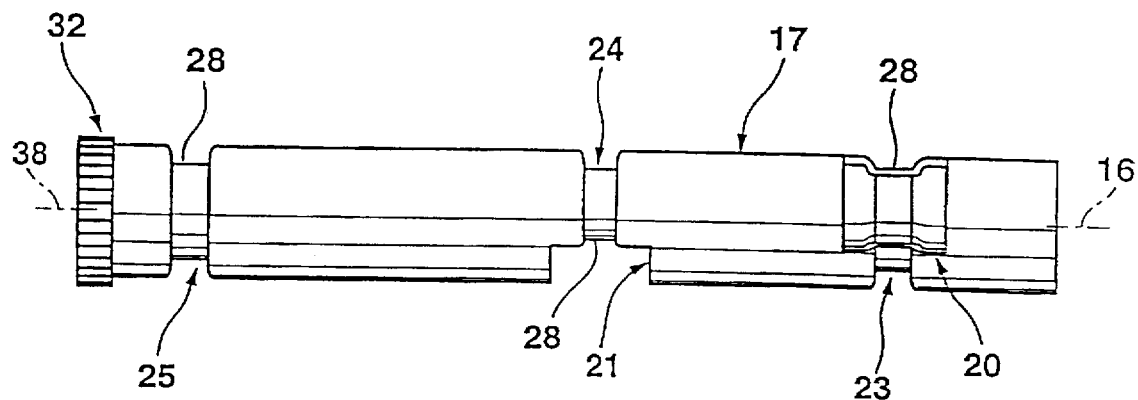
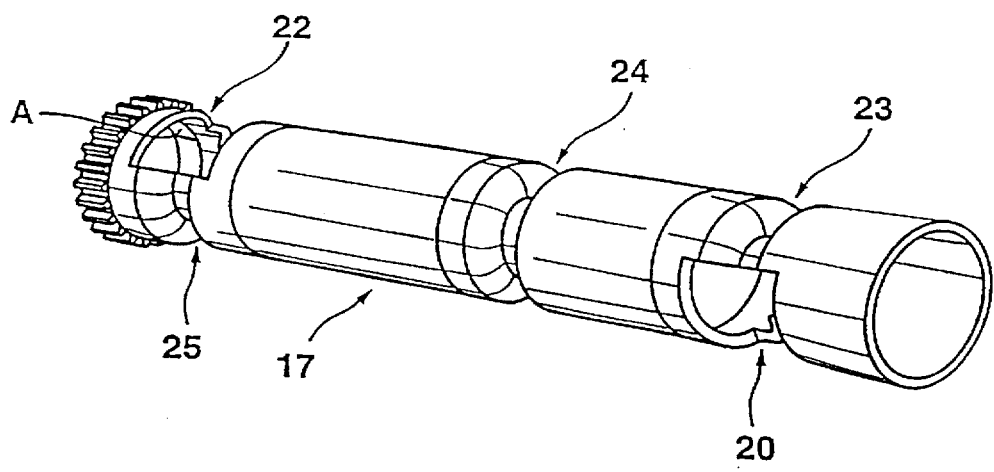
FIG. 3A

SHIFTER FOR MANUAL TRANSMISSIONS

BACKGROUND AND SUMMARY OF THE INVENTION

The invention relates to a shifter and, more particularly, to a shifter for manual gear transmissions with a multistage main transmission and an additional transmission located in-line in the power flow. A shifter shaft for changing the speeds of the main transmission is mounted rotationally and axially movably for optional operation of at least two shifter sliding sleeves, each being operated via an associated shifter fork of the main transmission. A coupling member of a rod coupling, mounted immovably with respect to the shifter shaft of the main transmission, is brought into engagement with a counter-coupling member of the rod clutch associated with a shifter fork of the main transmission when the shifter shaft of the main transmission is in a neutral position relative to the lengthwise directions of its rotational axis. The coupling member is brought into a rotational angle position associated with the respective shifter fork relative to the circumferential directions of its rotational axis. A coupling member immovable with respect to the shifter shaft of the main transmission is associated with each shifter fork of the main transmission. All the coupling members are offset with respect to one another in the lengthwise direction relative to the rotational axis of the shifter shaft of the main transmission. A shifter fork is operable by an auxiliary-force-driven positioning motor for shifting the gears of the additional transmission.

Manual transmissions are used for example in motor vehicles to change the torque and rpm of the driving machine and to adapt to the corresponding operating state of the vehicle. These transmissions typically consist of three shafts, a drive shaft, a countershaft parallel to the latter, and a main shaft or output shaft coaxial with the input shaft. To set the various transmission ratios, suitable gear pairings can be engaged in combination between the drive shaft and the countershaft and between the countershaft and the main shaft.

The gear pairings available for selection each consist of a gear that is fixed on the shaft and a gear that is rotatably mounted on the countershaft. To change the ratio, the rotatably mounted gear is connected nonrotatably with the shaft by means of a clutch that is positive as a rule.

The rotatably mounted gears, depending on the design and functional requirements, can be mounted on different shafts. The gears are usually shifted by means of a synchronous clutch or a claw clutch. To perform the shift, a sliding sleeve must be moved axially on the shaft in order to create the connection between the gear and the shaft.

The sliding sleeve is mounted nonrotatably and axially displaceably on the respective shaft for this purpose. The sliding sleeve is actuated by a shifter fork that is moved axially by a suitable mechanism or is pivoted around an axis that is integral with the housing.

Shifters of the above-mentioned type are characterized by a low structural cost because a corresponding shift rail for actuating the shifter forks can be eliminated.

In a shifter of this type known from U.S. Pat. No. 5,297,453, three shifter forks, each for actuating one shifter sliding sleeve, are mounted on the shifter shaft of the four-speed main transmission, while the single shifter sliding sleeve of the two-speed additional transmission is actuated by a positioning motor through a corresponding additional shifter fork. The positioning motor can be operated by a manual switch located on the handle of the manual shift lever for operating the shifter shaft of the main transmission. The shifter forks of the main transmission are provided with bearing eyes designed for direct mounting of the shifter forks on the shifter shaft of the main transmission. The shifter shaft of the main transmission is provided with one selector finger for each of the three shifter forks. The selector fingers are aligned flush with one another in a plane containing the rotational axis of the shifter shaft. The selector fingers also have the same radius with respect to the rotational axis. Slot-shaped recesses expanded segmentwise depart from the bearing eyes of the shifter forks. The respective selector fingers can move in the recesses relative to the shifter fork in the circumferential directions and in the axial directions of the rotational axis of the shifter shaft when the shifter shaft is not in the rotational angle position corresponding to the respective shifter fork.

In a shifter that is known, but is not of this type (DE-GM 17 31 865), for a single-range manual transmission, three shifter forks are mounted axially displaceably by their bearing eyes on a shifter rod. The rod is arranged axially parallel with respect to the shifter shaft, mounted axially movably in the transmission housing, and immovably connected with the shifter shaft by a dog in the axial directions. The three selector fingers of the shifter shaft that cooperate with a corresponding coupling groove of the shifter forks, as in the known shifter which is of this type, are aligned in a plane containing the rotational axis of the shifter shaft and are flush with one another as well as having the same radius with respect to the rotational axis, while the coupling grooves are staggered with respect to one another in the rotational directions.

In another known shifter of a different design (EP 0 301 724 B1), the shifter shaft has only one coupling member in the form of a selector finger for actuating all of the shifter forks. In the neutral position of the shifter shaft, the finger is capable of being pivoted into any one of the coupling grooves associated with the shifter forks, with each shifter fork being connected with a shifter rail located axially parallel with respect to its transmission shaft. The rail has the corresponding coupling groove for the selector finger at its end opposite the shifter fork.

A shifter that is not of the above-mentioned type (German Patent application P 44 43 523.1-12) has a shifter shaft with two selector fingers in a plane of the shifter shaft that contains the rotational axis of the shifter shaft. One selector finger serves for optional actuation of two shifter forks, while the second selector finger is used only to operate a third shifter fork. In this shifter as well, the coupling grooves for the engagement of the selector fingers are provided at the end of each shifter rail that is connected with a shifter fork and is located axially parallel with respect to the corresponding transmission shaft, so that the shifter shaft must be displaced axially in order to bring one of the selector fingers into engagement with a coupling groove.

The goal of the present invention is to provide, in a shifter according to the above-mentioned type, an automation of the shifting processes while incorporating the additional transmission that doubles the number of speeds.

This goal is achieved according to the present invention in an advantageous manner by a shifter for manual gear transmissions with a multistage main transmission and an additional transmission located in-line in the power flow. A shifter shaft for changing the speeds of the main transmission is mounted rotationally and axially movably for optional operation of at least two shifter sliding sleeves, each being operated via an associated shifter fork of the main transmission. A coupling member of a rod coupling, mounted immovably with respect to the shifter shaft of the main transmission, is brought into engagement with a counter-coupling member of the rod clutch associated with a shifter fork of the main transmission when the shifter shaft of the main transmission is in a neutral position relative to the lengthwise directions of its rotational axis. The coupling member is brought into a rotational angle position associated with the respective shifter fork relative to the circumferential directions of its rotational axis. A coupling member immovable with respect to the shifter shaft of the main transmission is associated with each shifter fork of the main transmission. All the coupling members are offset with respect to one another in the lengthwise direction relative to the rotational axis of the shifter shaft of the main transmission. A shifter fork is operable by an auxiliary-force-driven positioning motor for shifting the gears of the additional transmission. The shifter shaft of the main transmission is coupled with both a coaxially mounted positioning motor to actuate the shifter forks of the main transmission and with a stepping motor located in parallel for actuating the coupling members of the main transmission into the corresponding rotational angle positions through a first auxiliary transmission. A shifter roller coaxial with the shifter shaft of the main transmission is likewise coupled with the stepping motor for actuating the shifter fork of the additional transmission through a second auxiliary transmission. The free-running clutches with blocking directions that are opposite relative to one another are used. One free-running clutch links the shifter shaft of the main transmission with a coaxial gear of the first auxiliary transmission. The other free-running clutch connects the shifter roller of the additional transmission with a coaxial gear of the second auxiliary transmission.

In the shifter according to the invention, a given stepping motor is used both to actuate the shifter forks of the additional transmission and also to select the speeds of the main transmission.

In the case of the shifter according to the invention, a connection that is simple in terms of transmission technology is provided between the shifter shaft and the shifter roller to the stepping motor.

In the known shifter according to U.S. Pat. No. 5,297,453, the two shifter forks of the main transmission that are not involved in the shifting of the new speed are held in place by corresponding locking cams on a locking rail relative to the transmission housing. The rail is mounted movably with respect to the shifter shaft of the main transmission, axially relative to its rotational axis, and nonrotatably as well as immovably axially relative to the transmission housing, but otherwise movably. The locking rail received in a lengthwise slot in the outer circumference of the shifter shaft passes through the bearing eyes of the three shifter forks mounted on the shifter shaft, so that a complicated design of the through slots results at the bearing eyes for the locking rail, since free passage with respect to the locking rail need be provided only in the rotational angle position of the shifter shaft that corresponds to the respective shifter fork. In this known shifter, no passage by the shifter shaft of the main transmission through the significant rotational angle positions is either intended or possible.

In the known shifter, not according to the species, of German Patent document DE-GM 17 31 865, the two shifter forks that are not involved in engaging the new speed are held against the transmission housing by a locking sleeve traversed by the shifter shaft. The sleeve is mounted rotatable with respect to the rotational axis of the shifter shaft with respect to the shifter shaft and the transmission housing, but axially movably only with respect to the shifter shaft. The locking sleeve has a lengthwise slot parallel to the rotational axis, in which slot the three selector fingers of the shifter shaft engage. In addition, a fork-shaped counter-coupling member on the outer circumference of the bearing eye of the same shifter shaft engages the lengthwise slot, for which fork the shifter shaft is brought into the correct rotational angle position, so that the respective selector finger engages the coupling groove of the counter-coupling member. The two other counter-coupling members in each case then abut locking surfaces of recesses in the locking sleeve, which are both open relative to the lengthwise slot and also extend for a distance in the circumferential direction that makes the corresponding deviating rotational angle position possible. In this known shifter as well, no passage of the shifter shaft through the rotational angle positions corresponding to the shifter forks is either intended or even possible.

In the shifter according to the present invention on the other hand, a more advantageous locking of the shifter forks of the main transmission that are not involved in the shifting process is achieved by the design.

In the shifter according to the invention, an advantageous coupling device is created between the shifter shaft and each selector fork of the main transmission.

By virtue of the design of the shifter according to the invention, speeds can be skipped when shifting even when a stepper motor is used for the rotational drive of the shifter shaft.

Other objects, advantages and novel features of the present invention will become apparent from the following detailed description of the invention when considered in conjunction with the accompanying drawings.

BRIEF DESCRIPTION OF THE DRAWINGS

FIG. 3 is a view of the locking sleeve of FIG. 1, once in a side view and once in a perspective view;

DETAILED DESCRIPTION OF THE DRAWINGS

Figure 1:
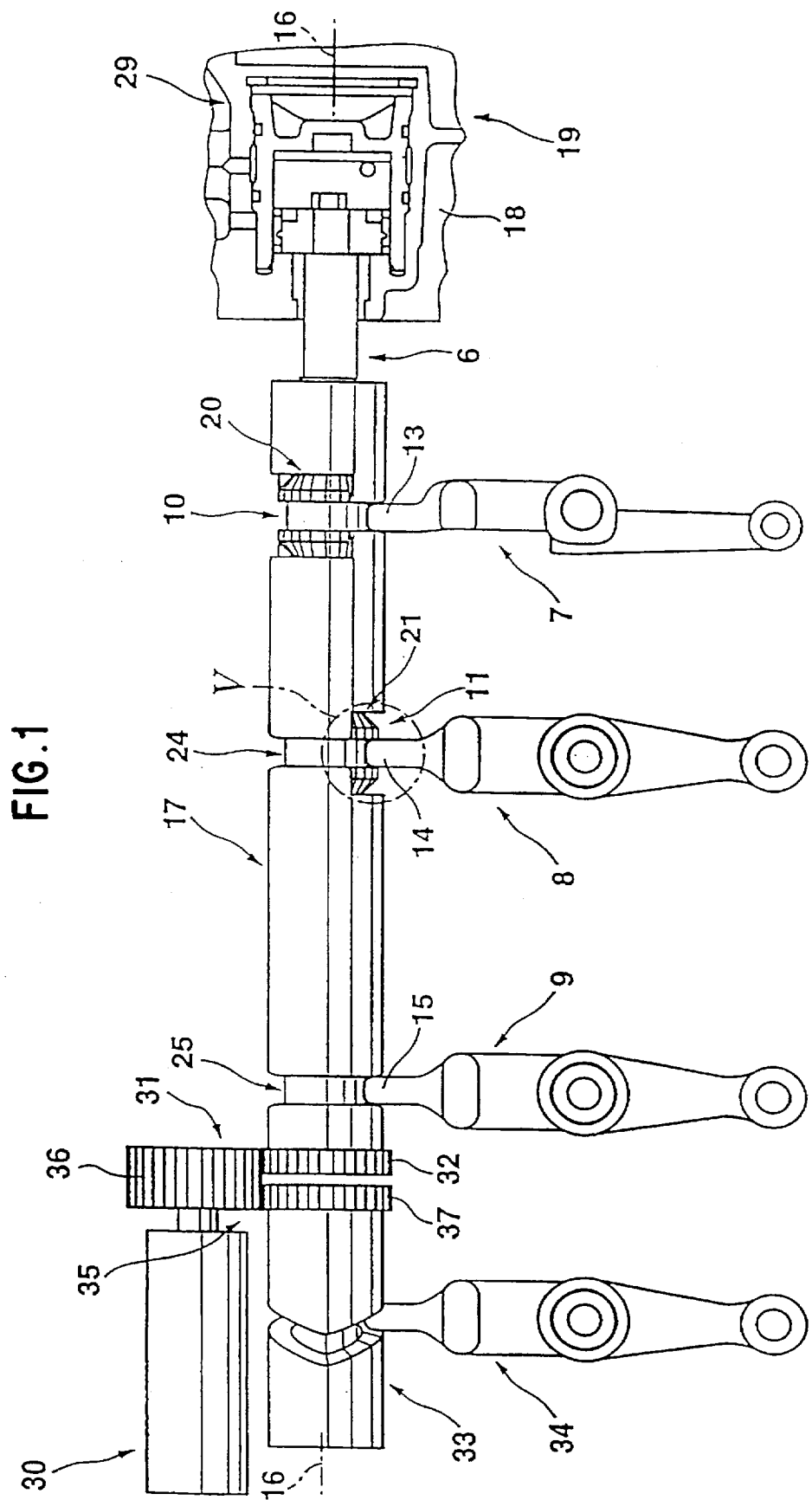
FIG. 1 illustrates an arrangement of a shifter according to the invention, with only the features that are essential to the invention being shown.
Figure 2:
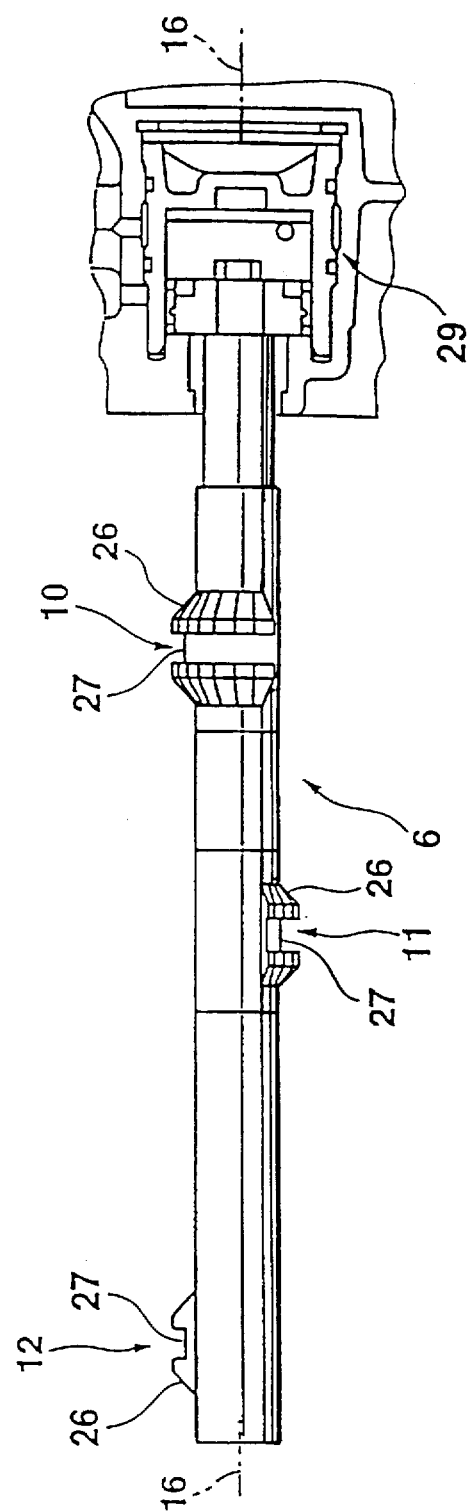
FIG. 2 is a diagram of the shifter shaft of the shifter shown in FIG. 1.
Figure 4:
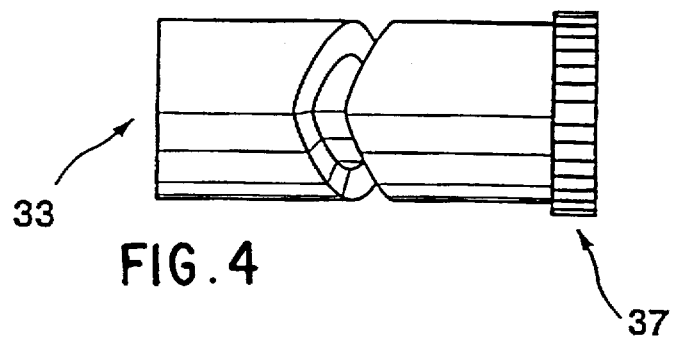
FIG. 4 is a view of the shifter roller of the shifter shown in FIG. 1, once in a side view and once in a perspective view.
Figure 4A:
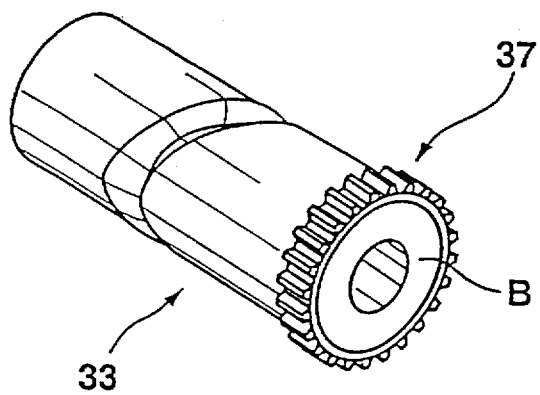

Initially with reference to FIG. 2, a shifter shaft 6 is provided with three coupling members 10 to 12 mounted thereon. The coupling members 10 to 12 are staggered with respect to one another both in the axial directions of the shaft's rotational axis 16—16 and in the circumferential directions as well. The members 10–12 each consist of a cam-like radial projection 26 with a coupling groove 27 running in the circumferential direction. The members are immovably mounted with respect to shifter shaft 6. Shifter shaft 6 is actuated in the axial directions of its rotational axis 16—16 by a pressure-medium positioning motor 29 of the axial-piston design in order to shift the gears, namely from a neutral position shown in FIG. 1, in which all the speeds are disengaged, optionally in one direction or the other to engage one of the two speeds associated with a shift gate.

Referring to FIG. 1, shifter shaft 6 is inserted into a locking sleeve 17 that has one window opening 20 to 22 for the three coupling members 10 to 12 of shifter shaft 6. The window openings, corresponding to the coupling members, are staggered with respect to one another on the circumference in the circumferential and axial directions of the rotational axis 38—38 of locking sleeve 17. Window openings 20 to 22 are so wide in the axial directions of rotational axis 38—38 that the respective coupling members 10 to 12 can perform a relative movement with respect to the locking sleeve 17 that corresponds to the respective shifting distance when engaging a gear. Window openings 20 to 22 are so wide in the circumferential directions of rotational axis 38—38 that shifter shaft 6 is nonrotatably connected by coupling members 10 to 12 with locking sleeve 17.

Locking sleeve 17 is mounted, in a manner not shown in greater detail, with respect to a housing part 18 of a shift housing 19 of the shifter in such fashion that locking sleeve 17 is immovably locked relative to the axial directions of its rotational axis 38—38, but is mounted rotatably relative to the circumferential directions of its rotational axis 38—38.

Figure 5:
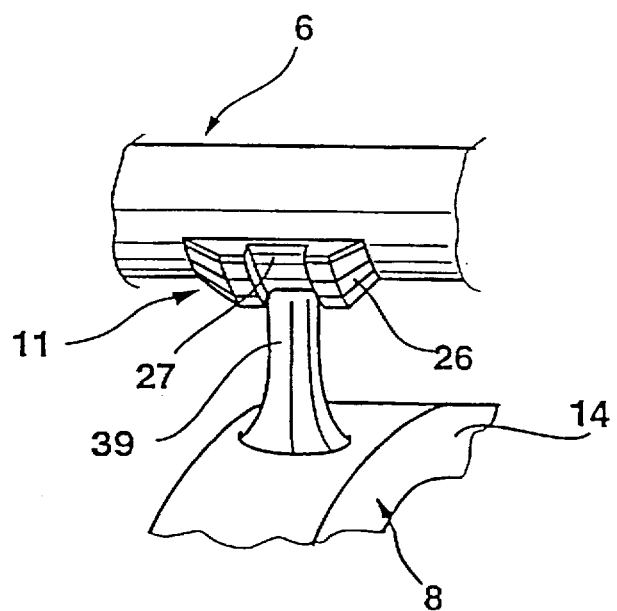
FIG. 5 is an enlarged perspective view of Section V illustrating the engagement of coupling member 11 with counter-coupling member 14 of the shifter in FIG. 1.

A counter-coupling member 13 to 15 for each of three shifter forks 7 to 9 can be brought into engagement with coupling grooves 27 of coupling members 10 to 12 of shifter shaft 6 in each of the specific rotational angle positions of shifter shaft 6. A coupling pin 39 (FIG. 5) of the respective counter-coupling member engages coupling groove 27 of the respective coupling member. Each of the shifter forks 7 to 9 in turn is coupled in a known fashion with a shifter sliding sleeve by whose displacement an associated gear of the manual transmission is coupleable with its shaft.

In order to lock those shifter forks which are not involved in a shifting process with respect to the shifter housing 19, locking sleeve 17 has guides 23 to 25 for the respective counter-coupling members 13 to 15 of the shifter forks 7 to 9, into which guides the respective coupling pins 39 enter when shifter shaft 6 is not in the rotational angle position that corresponds to the respective shifter fork. These guides are made in the form of groove-shaped constrictions 28, which are aligned flush with the respective coupling groove 27. Guides 23 to 25 each run continuously in the circumferential direction and are therefore interrupted only by the respective window openings 20 to 23. In this manner, shifter shaft 6, by rotating in a given rotational direction, can be coupled in any desired fashion with one of the shifter forks 7 to 9 without a specific sequence having to be followed when changing from one shifter fork to another.

Locking sleeve 17 is connected at its end away from positioning motor 29 by a free-running clutch A with a gear 32 of a gear transmission 31 that is coaxial with respect to the rotational axis 38—38. A gear 37 of another gear transmission 35 is mounted coaxially with respect to gear 32. Gear 37 is connected by a free-running clutch B with a shifter roller 33 that is located coaxially with respect to shifter shaft 6. The roller is used to actuate a shifter fork 34 which in turn can serve for optional shifting of the two ratios of an additional transmission, for example in the form of two transmission constants that lie in the power train between the input shaft and the countershaft.

Gear transmissions 31 and 35 have a common pinion 36 that meshes with its gear 32 or 37. The pinion in turn is drivable in both rotational directions by an electric stepping motor 30. Since the two free-running clutches A and B are each locked in the opposite rotational direction, shifter shaft 6 is rotated when the stepping motor operates in one rotational direction, while shifter roller 33 is rotated when stepping motor 30 is operated in its other rotational direction.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A shifting device for manual gear transmission having a main transmission and an additional transmission located in-line in a power flow, comprising:

a shifter shaft of said main transmission;

a positioning motor coaxially mounted with said shifter shaft;

shifter forks of the main transmission;

a stepping motor arranged in parallel with said shifter shaft, said shifter shaft being coupled with both the positioning motor and the stepping motor;

coupling members mounted in an offset manner on the shifter shaft, each of said coupling members corresponding with one of said shifter forks, said stepping motor actuating the coupling members into corresponding rotational angle positions via a first auxiliary transmission;

a shifter roller arranged coaxially with the shifter shaft, said shifter roller being coupled with the stepping motor for actuating an additional shifter fork of the additional transmission via a second auxiliary transmission;

two free-running clutches having blocking directions opposite relative to one another, one of said two free-running clutches linking the shifter shaft with a coaxial gear of the first auxiliary transmission and another of said two free-running clutches connecting the shifter roller of the additional transmission with another coaxial gear of the second auxiliary transmission.

2. A shifting device for a manual gear transmission having a multistage main transmission and an additional transmission coupled in-line in a power flow, comprising:

a shifter shaft, which changes speeds of the main transmission, mounted rotationally and axially movably to provide optional operation of at least two shifter sliding sleeves, each of said at least two shifter sliding sleeves being operated via an associated shifter fork of the main transmission;

coupling members of a rod coupling mounted immovably with respect to said shifter shaft, said coupling member being engageable with a counter-coupling member of a rod clutch associated with the shifter fork of the main transmission when the shifter shaft is in a neutral position relative to a lengthwise direction of its rotational axis, said coupling member being brought into a rotational angle position associated with a respective shifter fork relative to a circumferential direction of its rotational axis;

wherein one of said coupling members is associated with each of the shifter forks of the main transmission, each of said coupling members being immovable with respect to the shifter shaft of the main transmission, all of said coupling members being offset with respect to one another in the lengthwise direction relative to the rotational axis of the shifter shaft;

an auxiliary-force-driven positioning motor for operating the shifter fork to shift the gears of said additional transmission;

wherein said shifter shaft of the main transmission is coupled with both a coaxially mounted positioning motor to actuate the shifter forks of the main transmission and with a stepping motor located in parallel for actuating the coupling members of the main transmission into the corresponding rotational angle positions through a first auxiliary transmission;

a shifter roller coaxial with the shifter shaft of the main transmission likewise coupled with the stepping motor for actuating a shifter fork of the additional transmission through a second auxiliary transmission; and two free-running clutches having blocking directions opposite relative to one another, one of said two free-running clutches being used to link the shifter shaft of the main transmission with a coaxial gear of the first auxiliary transmission, the other of said two free-running clutches being used to connect the shifter roller of the additional transmission with another coaxial gear of the second auxiliary transmission.

3. Shifter according to claim 2, wherein the stepping motor is in a driving connection with a pinion which meshes with both the coaxial gear connected with the shifter shaft of the main transmission and with said another coaxial gear connected with the shifter shaft of the additional transmission.

4. Shifter according to claim 2, wherein a locking sleeve, concentric with respect to the shifter shaft of the main transmission, is provided that is immovable with respect to a housing part of a shifter housing relative to the axial directions of the rotational axis of the locking sleeve and is rotationally movable relative to the circumferential directions of the rotational axis of the locking sleeve, said locking sleeve also being provided with an arrangement of window openings that depends on the number and on the opposite position, corresponding to the coupling members that are immovable with respect to the shifter shaft of the main transmission, to allow the respective counter-coupling member to pass through said window openings;

wherein the shifter shaft of the main transmission is connected with the locking sleeve in a nonrotatable fashion and with limited axial motion; and wherein the locking sleeve is provided on its outer circumference with guides originating in each window opening and extending in a circumferential direction, into which guides the respective counter-coupling member engages when the shifter shaft of the main transmission is not in the rotational angle position that corresponds to a matching shifter fork.

5. Shifter according to claim 4, wherein a cam-type projection, with a coupling groove running in the circumferential direction, is used for the coupling member which is immovable with respect to the shifter shaft of the main transmission.

6. Shifter according to claim 5, wherein a groove-type constriction is used as the guide which is made flush with the coupling groove in the circumferential direction.

7. Shifter according to claim 6, wherein said constriction is made continuous in the circumferential direction.

8. Shifter according to claim 2, wherein at least one or the shifter forks coupleable with the shifter shaft of the main transmission is directly connected with its counter-coupling member.

* * * * *